W. E. GERRY.
CHART FOR FOUNTAIN PENS.
APPLICATION FILED MAR. 24, 1919.
1,351,564.  Patented Aug. 31, 1920.
TEMPOINT
WRITING CHART
*There's A Tempoint that Writes Like You*
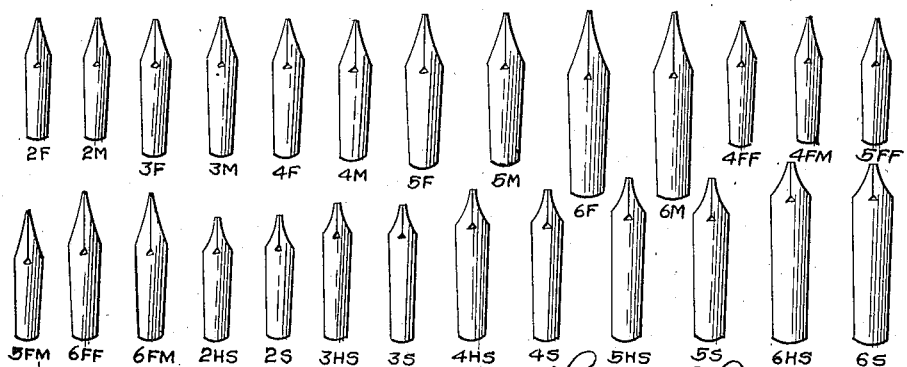

UNITED STATES PATENT OFFICE.

WILFRED E. GERRY, OF CHICAGO, ILLINOIS, ASSIGNOR TO THE WAHL COMPANY, OF WILMINGTON, DELAWARE, A CORPORATION OF DELAWARE.

CHART FOR FOUNTAIN-PENS.

1,351,564.   Specification of Letters Patent.   Patented Aug. 31, 1920.

Application filed March 24, 1919. Serial No. 284,885.

*To all whom it may concern:*

Be it known that I, WILFRED E. GERRY, a citizen of the United States, residing at Chicago, in the county of Cook and State of Illinois, have invented certain new and useful Improvements in Charts for Fountain-Pens, of which the following is a specification.

My invention is an improved chart to enable one to determine the proper pen point with which to write and has for its object the presentation, in tabular form, of a variety of specimens of handwriting, and also having associated with such handwriting legends informing the user of the chart of the proper kind of a penpoint with which to write.

My invention will be best understood by reference to the accompanying drawing, which is a reproduction of my improved chart.

In said chart I have disclosed a variety of specimens of handwriting, shown in lines 2F, 2M, 3F, 3M, 4F, 4M, 5F, 5M, 6F, 6M, 4FF, 4FM, 5FF, 5FM, 6FF, 6FM, 2HS, 2S, 3HS, 3S, 4HS, 4S, 5HS, 5S, 6HS and 6S, and I have illustrated a series of pen points, or nibs, similarly designated and with which the handwriting occurring in the corresponding line was written. For instance, the signature "Josephine McGee" in line 3M was written with a pen nib labeled 3M in the upper portion of the chart, and so on.

In order to use my improved chart it is only necessary for a person to select whichever one of the signatures on the chart most nearly resembles his own. This being done, he refers to the legend at the left of the signature, which legend informs him of the pen nib which would be most suitable to the handwriting of the particular individual.

I have found this chart of great advantage in the handling of fountain pens. These pens come with a variety of nibs or points and it is a matter of quite a good deal of trial and experiment for the customer to select the nib which best suits the customer's hand. By use of my improved chart, all that is necessary is for the customer to write his name in his ordinary handwriting. His signature is then compared with my improved chart and a signature is selected which most nearly corresponds with the signature of the customer. The legend at the left of this selected signature will then designate the proper pen nib to be used by the customer. Having obtained this information, this nib can be selected from the dealer's stock at once and will be found to suit the style of handwriting individual to the customer.

Many improvements and variations may be made from the precise arrangement of the chart herein shown without departing from the spirit of my invention, since I claim:

1. In a chart for the selecting of pen nibs, the combination of a plurality of specimens of handwriting, a directive legend associated with each specimen of handwriting, and an illustration of various styles of pen nibs, each pen nib being suitable for use with one of the styles of handwriting and having associated therewith a legend corresponding to the legend associated with the style of handwriting intended to be written by said pen nib.

2. In a chart for the selection of writing instruments, a plurality of specimens of writing having different characteristics, illustrations of a plurality of writing instrumentalities and a common legend associated with each writing instrumentality and each specimen of handwriting, whereby the proper writing instrumentality for any particular handwriting may be determined.

In witness whereof I have hereunto subscribed my name.

WILFRED E. GERRY.